United States Patent [19]

House

[11] Patent Number: 5,598,795
[45] Date of Patent: *Feb. 4, 1997

[54] TUBE ALIGNMENT BRACKET

[76] Inventor: John L. House, P.O. Box 552, Oak Grove, La. 71263

[*] Notice: The term of this patent shall not extend beyond the expiration date of Pat. No. 5,271,343.

[21] Appl. No.: 438,619

[22] Filed: May 10, 1995

Related U.S. Application Data

[63] Continuation-in-part of Ser. No. 348,361, Nov. 30, 1994, Pat. No. 5,490,470.

[51] Int. Cl.$^6$ .................................................. A01C 15/00
[52] U.S. Cl. ............................ 111/186; 111/80; 111/170
[58] Field of Search .................................. 111/186, 188, 111/80, 170, 180, 129; 403/13, 336, 358, 403, 231; 52/150, 151, 152, 146

[56] References Cited

U.S. PATENT DOCUMENTS

| 1,905,767 | 4/1933 | Traphagen . | |
|---|---|---|---|
| 1,906,351 | 5/1933 | White . | |
| 1,921,886 | 8/1933 | Kriegbaum | 111/73 |
| 2,623,483 | 12/1952 | Stevenson | 111/73 |
| 2,808,792 | 10/1957 | Brickman | 111/186 |
| 2,861,527 | 11/1958 | Phillips | 111/87 |
| 2,903,982 | 9/1959 | Floy | 111/7 |
| 2,968,266 | 1/1961 | Gustafson | 111/80 |
| 2,990,186 | 6/1961 | Gandrud | 275/14 |
| 3,120,965 | 2/1964 | MacDonald | 285/18 |
| 3,399,638 | 9/1968 | Waldrum | 111/6 |
| 3,888,446 | 6/1975 | O'Brien | 248/231 |
| 3,891,332 | 6/1975 | Molyneux | 403/13 |
| 4,276,836 | 7/1981 | Pust | 111/86 |
| 4,388,878 | 6/1983 | Demzin | 111/86 |
| 4,424,757 | 1/1984 | Gibbens | 111/7 |
| 4,580,506 | 4/1986 | Fleischer | 111/7 |
| 4,608,794 | 9/1986 | Delise | 52/288 |
| 5,025,736 | 6/1991 | Anderson | 111/152 |
| 5,033,398 | 7/1991 | Froc | 111/52 |
| 5,136,954 | 8/1992 | Fetaz et al. | 111/123 |
| 5,271,343 | 12/1993 | House | 111/186 |
| 5,490,470 | 2/1996 | House | 111/186 |

Primary Examiner—Terry Lee Melius
Assistant Examiner—Robert Pezzuto
Attorney, Agent, or Firm—John M. Harrison

[57] ABSTRACT

A tube alignment bracket for mounting on or shaped integrally with the seed distribution tube of a seed planter to align multiple planter insecticide tubes in close proximity to, and in a vertical plane with, the discharge opening of the seed distribution tube and insure that liquid insecticide or fungicide dispensed through the insecticide tubes are deposited in a furrow in close proximity to seeds expelled from the seed distribution tube. In a preferred embodiment the tube alignment bracket is characterized by an elongated, I beam-shaped leg plate strengthened by a pair of braces, one end of which leg plate extends from a bracket plate which is slotted and is strapped to or formed integrally with the seed distribution tube. The leg plate is fitted with at least one pair of openings or a slot to receive and position the insecticide tubes in close, fixed proximity with respect to the discharge opening of the seed distribution tube.

15 Claims, 1 Drawing Sheet

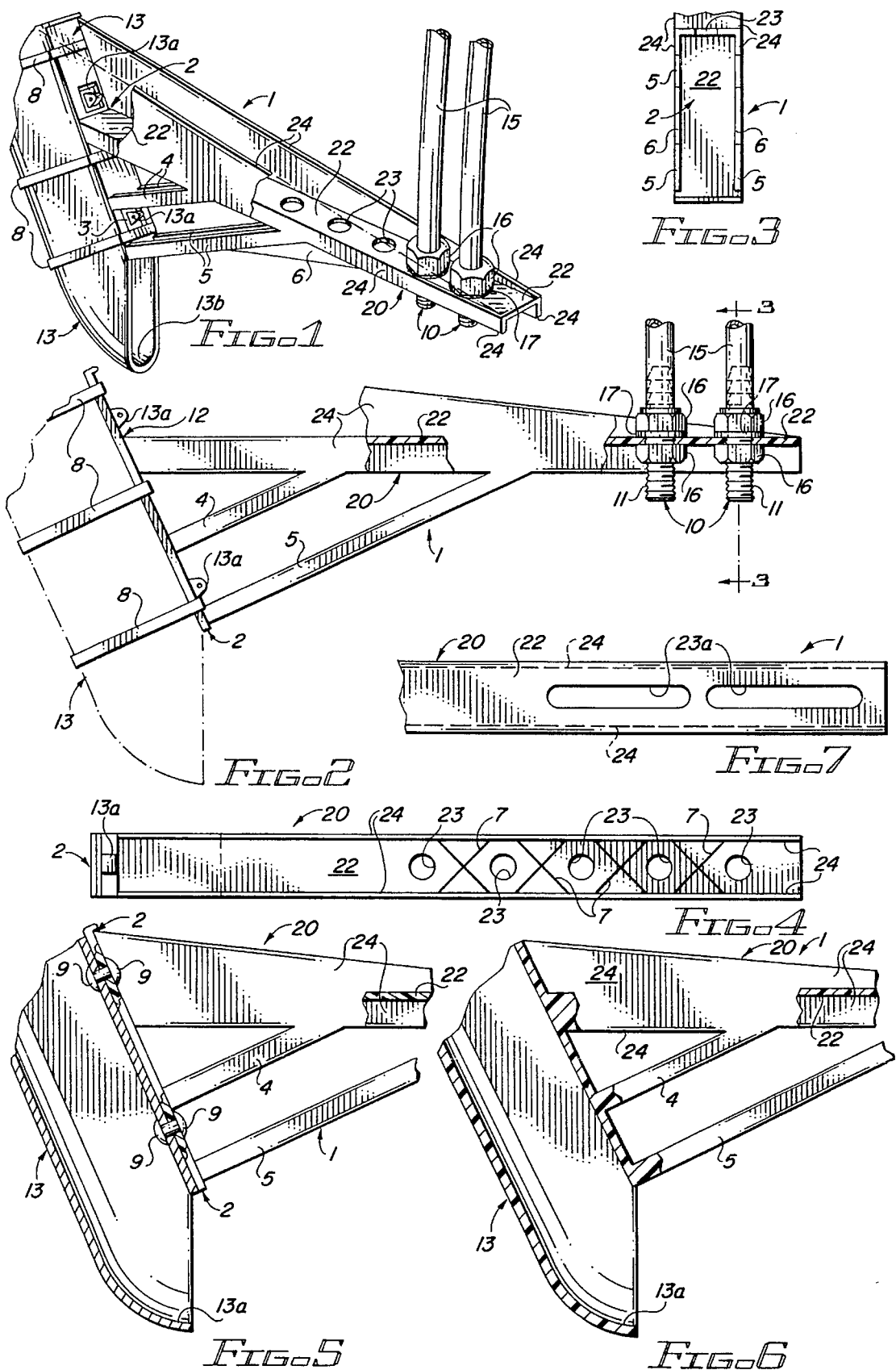

TUBE ALIGNMENT BRACKET

CROSS-REFERENCE TO RELATED APPLICATIONS

This application is a Continuation-In-Part of my U.S. application Ser. No. 08/348,361, filed Nov. 30, 1994 now U.S. Pat. No. 5,490,470.

BACKGROUND OF THE INVENTION

1. Field of the Invention

Proper in-furrow insecticide-fungicide and seed placement is an important problem which faces growers annually during the planting season. The problem includes application of toxic, systemic, liquid or granular insecticides and/or fungicides in close proximity to seeds as the seeds are expelled in spaced relationship in furrows created by the seed planter, to minimize attack by organisms such as thrips. The proper placement of the insecticide/fungicide directly in the furrows is crucial to avoid environmental damage, and effective location with respect to the seeds helps to avoid seed damage and positions the insecticide/fungicide in position such that young, emerging roots of the germinated seed are able to contact the treatment material, pick it up and translocate it. When the insecticide/fungicide is spaced too far from the seeds, the emerging roots are able to pick up less of the material, resulting in inadequate protection for the growing plant. It is accepted by experts in the agricultural field that either the tap root or the feeder roots that spring from the germinating seeds must be in an insecticide/fungicide material to effect optimum protection of the plant.

It has also been found that streaking insecticide or fungicide in the field is environmentally abusive and a waste of money, since many of the insecticide/fungicide materials are toxic and expensive, making proper placement of the insecticide/fungicide in the furrows with respect to the seed at each seed deposition, highly important. Improper seed insecticide/fungicide placement results in the requirement of additional expensive folier application and increases the expense of the crop, as well as the risk to the environment.

Conventional planting devices are fitted with both seed distribution tubes and insecticide tubes, the seed distribution tubes being used to uniformly deposit seeds in spaced relationship in furrows created by the planter and the insecticide tubes utilized to distribute insecticide and/or fungicide in the furrows in close proximity to each seed before the seed and insecticide/fungicide are covered with earth by the planter. In a typical application, the seed and insecticide/fungicide are sufficiently spaced to optimize the desired protective effects of the insecticide/fungicide on the seeds and the plants emerging from the seeds. However, far too often, the insecticide/fungicide is not accurately delivered to the furrows and may be spilled randomly in the earth adjacent to the furrows, where it presents a danger to the environment and fails to properly treat the germinating seeds.

2. Description of the Prior Art

An article entitled "Precision Placement of In-Furrow Insecticide Reduces Costs" in the "Cotton Farming" magazine, 35th Anniversary Issue, dated March, 1992, describes a pipe welded to the bracket that holds the insecticide granule tube of a planter, to extend the insecticide tube and facilitate deposition of insecticide granules closer to the ground near the bottom of the furrows. Various other attachments are known in the art for use with seed planters in applying fertilizer and the like in furrows during planting. U.S. Pat. No. 2,903,982, dated Sep. 15, 1959, to D. W. Floy, details a "Liquid Fertilizer Attachment for a Corn Planter". The attachment includes a jet-pipe attached to a supply hose, which is, in turn, connected to a tank containing liquid fertilizer. The pipe is then projected through or into a corn planter runner and is adapted to apply a stream of liquid fertilizer simultaneously with planting of the corn. U.S. Pat. No. 2,968,266, dated Jan. 17, 1961, to A. W. Gastafson, details an "Apparatus For Treating Soil during Planting". The device includes equipment which is mounted on a conventional planting apparatus, such that a single device for mixing the chemicals may serve multiple rows by using planting apparatus and equipment driven by the power takeoff of a tractor. The planting apparatus forms a part of the equipment for mixing the chemicals with the soil. U.S. Pat. No. 2,990,186, dated Jun. 27, 1961, to E. S. Gandrud, details a "Device for Spreading Granular Material". The device includes a distributor head having vertically-disposed front and rear walls and downwardly-diverging sidewalls and defining an inlet opening in its upper end and an open bottom for discharging material. A baffle structure in the head between the inlet opening and the open bottom includes multiple baffle sections, wherein one of the generally vertical walls may be quickly and easily removed for easy access to the baffle section for adjustment and cleaning. The device is designed to spread granular material in multiple rows over planted seeds in a field. A "Tube Connector" is detailed in U.S. Pat. No. 3,120,965, dated Feb. 11, 1964, to J. A. MacDonald. The tube connector is characterized by a connector device wherein a first tube can be connected to a second tube at any convenient level along the length of the ladder and at any point on the circumference, at that level. U.S. Pat. No. 3,399,638, dated Sep. 3, 1968, to J. E. Aldrum, et al, details an "Agricultural Spray Device". Disclosed is a low volume agricultural liquid spray device which includes a reservoir for the liquid to be sprayed and a feed mechanism to deliver the liquid under constant head to a spindle having a bore which defines a flow path. A spray device depends from the spindle and a drive system operates to rotate the spindle at a predetermined rate about its axis, wherein the spray device also rotates at the predetermined rate to dispense low volumes of agricultural liquid in a uniform, relatively coarse spray. U.S. Pat. No. 4,276,836, dated Jul. 7, 1981, to W. H. Pust, details a "Grain Drill Utilizing A Fertilizer Spout and Adjustable Deflector Therefor". The grain drill includes a furrow opener, a forwardly-disposed seed distribution spout, a rearwardly-disposed fertilizer spout and a deflector plate positioned beneath the fertilizer spout, so that a desired quantity of the fertilizer discharged from the lower end of the fertilizer spout is deflected laterally. The deflector plate is adjustable forwardly and rearwardly with respect to the seed distribution spout, so that the quantity of fertilizer flowing over the forward edge of the deflector plate can be controlled by the position of the forward edge of the deflector plate with respect to the seed distribution spout. A "Liquid Fertilizer Attachment" is detailed in U.S. Pat. No. 4,580,506, dated Apr. 8, 1986, to Matthew W. Fleischer, et al. The device includes a fertilizer knife adapted to be attached to a planter. A housing is adjustably attached to the fertilizer knife and an adjustable mechanism is provided for permitting the knife to be adjusted vertically with respect to the housing, thereby adjusting the effective depth that the fertilizer, in liquid form, will be released. The fertilizer knife is attached to the housing, wherein the fertilizer knife will accurately track in front of the line into which the seeds are being planted and this pivoting feature also permits the fertilizer knife to be deflected to one side or the other temporarily, when rocks or other potentially damaging obstructions are encountered. The fertilizer knife has a leading edge extending from a point in close proximity to a vertical pivotal axis and tapers downwardly and rearwardly from that axis. My U.S. Pat. No. 5,271,343, which issued on Dec. 21, 1993, details a tube alignment bracket for aligning insecticide/fungicide tubes with the seed distribution tube of a planter. Other patents which are pertinent to the subject of this application are as follows: U.S. Pat. No. 1,906,351, dated May 2, 1933; U.S. Pat. No. 1,905,767, dated Apr. 25, 1933; U.S. Pat. No. 3,891,332, dated Jun. 24, 1975; U.S. Pat. No. 1,921,886, dated Aug. 8, 1933; U.S. Pat. No. 2,623,483, dated Dec. 30, 1952; U.S. Pat. No. 2,861,527, dated Nov. 25, 1958; U.S. Pat. No. 3,888,446, dated Jun. 10, 1975; U.S. Pat. No. 4,424,757, dated Jan. 10, 1984; U.S. Pat. No. 4,608,794, dated Sep. 2, 1986; U.S. Pat. No. 5,025,736,dated Jun. 25, 1991; U.S. Pat. No. 5,033,398, dated Jul. 23, 1991; U.S. Pat. No. 4,388,878, dated Jun. 21, 1983; and U.S. Pat. No. 5,136,954, dated Aug. 11, 1992.

It is an object of this invention to provide a new and improved tube alignment bracket for aligning the insecticide/fungicide tube on tubes of a planter with a planter seed distribution tube to facilitate application of liquid insecticide or fungicide in selected close proximity to seeds as the seeds are sequentially deposited in furrows created by the planter.

Another object of this invention is to provide a new and improved tube alignment bracket for mounting on or extending integrally from the respective seed distribution tube of a seed planter, accepting the discharged ends of the insecticide tubes and aligning the insecticide tubes in selected, adjustable proximity to the discharge ends of the seed distribution tubes along the respective furrows to insure application of liquid insecticide/fungicide from the insecticide tubes in furrows in close proximity to the seeds as the seeds are deposited into furrows.

Yet another object of this invention is to provide a plastic or fiberglass tube alignment bracket for aligning the discharge ends of multiple, respective insecticide tubes and seed distribution tubes in a seed planter, which tube alignment bracket includes an elongated, I beam-shaped leg plate, one end of which is slotted or perforated and the other end of which extends from a bracket plate mounted on a corresponding seed distribution tube, the leg plate strengthened by a pair of braces and gussets. The slot or multiple holes in the extending end of the leg plate receive multiple cylindrical tube mounts or fittings which stabilize the respective insecticide tubes and position the discharge ends of the insecticide tubes in a selected close proximity to the discharge ends of the respective seed distribution tubes, for depositing the insecticide or fungicide liquid in close proximity to the seeds when the seeds are deposited in the furrow.

SUMMARY OF THE INVENTION

These and other objects of the invention are provided in new and improved, injection-molded plastic tube alignment bracket for use in seed planters for the purpose of orienting the discharge ends of the planter insecticide tubes with the corresponding discharged ends of the planter seed distribution tube or tubes. In a preferred embodiment the tube alignment bracket is characterized by a flat bracket plate, the ends of which are provided with slots for receiving the spaced-apart projecting tube nibs of a seed tube and mounting the tube alignment bracket on the seed tube using pipe straps. An elongated, generally I beam-shaped leg plate extends from integral connection to the bracket plate and the extending end of the leg plate is fitted with a slot or multiple holes for receiving the insecticide tubes, to insure that the liquid insecticide or fungicide discharged from the insecticide tubes strikes the furrow in close proximity to, and in alignment with, seeds discharged in spaced sequence in the furrow from the seed distribution tube or tubes. Two pairs of brackets and gussets extend from the bracket plate to the leg plate for bracing purposes. Although the tube alignment bracket may be fitted with one or more tie strap or band slots for receiving one or more tie straps or bands and securing the tube alignment bracket to the corresponding seed discharge tube as described above, the leg plate may also be shaped integrally with the seed distribution tube or the bracket plate bradded to the seed distribution tube, as desired.

BRIEF DESCRIPTION OF THE DRAWINGS

The invention will be better understood by reference to the accompanying drawing, wherein:

FIG. 1 is a perspective view of a seed distribution tube with a preferred embodiment of the tube alignment bracket of this invention removably attached to the seed distribution tube by means pipe straps;

FIG. 2 is a side view of the tube alignment bracket illustrated in FIG. 1 with the seed distribution tube illustrated in phantom, more particularly illustrating the removable pipe strap mounting of the tube alignment bracket to the seed distribution tube;

FIG. 3 is a sectional view taken along line 3—3 in FIG. 2, of the leg plate element of the tube alignment bracket illustrated in FIG. 1 at an insecticide tube;

FIG. 4 is a top view of the tube alignment bracket detached from the seed distribution tube illustrated in FIG. 1, absent the;insecticide tubes;

FIG. 5 is a side view, partially in section, of an alternative method of attaching the tube alignment bracket to the seed distribution tube, using brads; and FIG. 6 is a side view, partially in section, of an alternative preferred embodiment of the invention, wherein the tube alignment bracket is integrally formed with the seed distribution tube; and FIG. 7 is a top view, partially in section, of a tube alignment bracket of still another embodiment of the invention.

DESCRIPTION OF THE PREFERRED EMBODIMENTS

Referring initially to FIGS. 1–3 of the drawing, the applicable seed distribution element of a typical conventional single insecticide tube seed planter (not illustrated) includes a seed distribution tube 13, having a tube discharge opening 13b in the discharge end thereof. The seed planter is pulled by a tractor (also not illustrated) to create a furrow (not illustrated), into which both seeds and fungicide, as well as liquid insecticide are introduced, the latter through conventional insecticide tubes 15. A first preferred embodiment of the tube alignment bracket of this invention is generally illustrated by reference numeral 1 and is mounted on the conventional seed tube 13, attached to the conventional planter (not illustrated). In this embodiment of the invention the tube alignment bracket 1 is characterized by a flat bracket plate 2, provided with a pair of longitudinal, spaced-apart plate slots 3 and lying along the front edge of the seed tube 13. The slots 3 accommodate the spaced-apart tube ribs 13a, respectively, of the seed distribution tube 13 and the tube alignment bracket 1 is attached to the seed tube 13 by means of three tie straps 8. In a preferred embodiment an elongated leg plate 22 of the tube alignment spacer bracket 20 extends from the bracket plate 2 and is fitted with multiple, spaced-apart plate openings 23 or plate slots 23a to accommodate one or more tube fittings 10, having fitting threads 11 and mounted on the leg plate 22 of the tube alignment spacer bracket 20, by means of tube fitting nuts 16 and washers 17. The tube fittings 10 mount a pair of insecticide tubes 15, as illustrated in FIGS. 1 and 2. In a most preferred embodiment the tube alignment spacer bracket 20 is shaped in the configuration of an I beam, for strength and rigidity, the I beam defining a flat leg plate 22, having upwardly and downwardly-extending, opposite plate flanges 24 extending along the entire length of the leg plate 22. In another preferred embodiment of the invention the upper plate flanges 24 are tapered from the extending end of the leg plate 22 to a maximum width at the bracket plate 2 for optimum strength. Furthermore, a pair of inside braces 4 and outside braces 5 extend from the respective plate flanges 24 of the tube alignment spacer bracket 20 in parallel relationship with respect to each other, to the bracket plate 2 for stiffening the leg plate 22 of the tube alignment spacer bracket 20 in place and maintaining the insecticide tubes 15 in a selected position and spacing with respect to the tube discharge opening 13b in the discharge end of the seed distribution tube 13. Gussets 6 further brace the outside braces 5 and cross-craces 7 braces the top pair of plate flanges 24, as illustrated in FIG. 4.

It will be appreciated by those skilled in the art that the conventional insecticide tubes 15 may be removably seated in either the plate openings 23 or the plate slots 23a by means of the tube fittings 10, tube fitting nuts 16 and washers 17 as described above or otherwise, by means of alternative connectors, according to the knowledge of those skilled in the art. The essential element in all such mountings is to insure that the discharge ends of the respective insecticide tubes 15 are removably and adjustably stabilized with respect to the tube discharge opening 13b of the seed distribution tube 13, to facilitate precise location of the seeds discharged from the seed distribution tube 13 with respect to the liquid insecticide and/or fungicide discharge from the insecticide tubes 15.

Referring now to FIG. 5 of the drawings in another preferred embodiment of the invention, the bracket plate 2 of the tube alignment bracket 1 is attached to the seed distribution tube 13 by brads 9, which extend through the bracket plate 2 and the wall of the seed distribution tube 13 for mounting purposes.

In yet another preferred embodiment of the invention and referring to FIG. 6 of the drawing, the tube alignment bracket 1 is integrally shaped with the seed distribution tube 13, thus eliminating the bracket plate 2 and facilitating fixed, non-removable extension of the tube alignment bracket 1 from the seed distribution tube 13. Accordingly, under these circumstances, the insecticide tubes 15 are automatically positioned in stabilized, yet adjustable, relationship with respect to the discharge end of the seed distribution tube 13 at the tube discharge opening 13b, and can only be adjusted with respect to that location by repositioning in either the plate openings 23 or plate slots 23a, as illustrated in FIGS. 1 and 7, respectively.

In operation, and referring again to FIG. 1 of the drawing, the conventional planter (not illustrated) operates to initially open a furrow (not illustrated) along a planting row in conventional manner. The seed distribution tube 13 is then utilized to conventionally distribute seeds (not illustrated) which are discharged from the discharge end 13b of the seed distribution tube 13 in a selected, spaced sequence into the furrow by a suitable seed distribution mechanism in the seed planter, which mechanism is well known to those skilled in the art. Simultaneously, the several insecticide tubes 15 operate to dispense insecticide and/or fungicide liquid (not illustrated) in the furrow in close proximity to the seeds to insure proper interaction with the roots of the emerging plants as the seeds germinate. Conventional closing wheels (not illustrated) mounted on the planter then close the furrow, covering the seeds and insecticide and/or fungicide liquid and effectively planting the seeds. Whether shaped integrally with, or mounted on the seed distribution tube 13, the tube alignment bracket 1 maintains the discharge opening 13b of the seed distribution tube 13 in a common vertical plane with, and spaced a selected distance from, the discharge ends 15a of the insecticide tubes 15 at all times during the planting operation. This function is assured since, referring again to FIGS. 1–3 of the drawing, the tube alignment bracket 1 is mounted on or integrally provided in the seed distribution tube 13, to fix one or more insecticide tubes 15 with respect to the seed distribution tube 13. This location facilitates continuous deposition of the insecticide or fungicide liquid directly on the furrow centerline without scattering or "streaking" the liquid, in consistently proper proximity to and alignment with the seeds, which are sequentially dispensed from the lower portion of the tube discharge opening 13b as the seed planter moves in the desired direction of travel.

It will be appreciated by those skilled in the art that while a preferred material of construction for the tube alignment bracket 1 of this invention is a plastic material capable of being injection-molded as heretofore described, other materials such as wood, fiberglass, metal and the like, in non-exclusive particular, may also be used.

While the preferred embodiments of the invention have been described above, it will be recognized and understood that various modifications may be without departing from the spirit and scope of the invention.

Accordingly, having described my invention with the particularity set forth above,

What is claimed is:

1. A tube alignment bracket for mounting on a planter having a seed distribution tube including at least one projecting nib for dispensing seeds and at least one treatment tube for dispensing treatment liquid, said tube alignment bracket comprising a bracket plate carried by the seed distribution tube, at least one slot provided in said bracket plate for receiving the nib, band means encircling said bracket plate and the seed distribution tube for removably mounting said tube alignment bracket on the seed distribution tube, a leg plate extending from said bracket plate for receiving the treatment tube and locating the treatment tube in substantially fixed proximity with respect to the seed distribution tube and at least one brace connecting said bracket plate and said leg plate, whereby liquid treatment material dispensed from the treatment tubes strike the earth in a selected, close proximity to seeds ejected from the seed distribution tube responsive to operation of the planter.

2. The tube alignment bracket of claim 1 wherein said leg plate comprises an I beam-shaped leg plate.

3. The tube alignment bracket of claim 1 wherein said at least one brace comprises a pair of braces extending from said leg plate to said bracket plate in substantially parallel relationship with respect to each other.

4. The dual tube alignment bracket of claim 1 wherein said leg plate comprises a substantially I beam-shaped leg plate and said at least one brace comprises a pair of braces extending from said leg plate to said bracket plate in substantially parallel relationship with respect to each other.

5. The tube alignment bracket of claim 1 wherein said at least one brace comprises a pair of braces extending from said leg plate to said bracket plate in substantially parallel relationship with respect to each other and the seed distribution tube has a pair of projecting nibs spaced from each other and wherein said at least one slot comprises a pair of slots provided in said bracket plate in spaced relationship with respect to each other for receiving the nibs, respectively, and band means encircling said bracket plate and the seed distribution tube for removably mounting said tube alignment bracket on the seed distribution tube.

6. The tube alignment bracket of claim 5 wherein said leg plate comprises a substantially I beam-shaped leg plate.

7. The tube alignment bracket of claim 1 comprising at least one plate opening provided in said leg plate for receiving the treatment tube and stabilizing the treatment tube with respect to the seed distribution tube.

8. The tube alignment bracket of claim 7 wherein said at least one plate opening comprises a plurality of plate openings provided in spaced relationship with respect to each other in said leg plate for receiving a plurality of treatment tubes, with each of the treatment tubes spaced a selected distance from the seed distribution tube.

9. The tube alignment bracket of claim 8 wherein said leg plate comprises a pair of braces extending from said leg plate to said bracket plate in substantially parallel relationship with respect to each other.

10. The tube alignment bracket of claim 9 wherein said band means comprises three tie straps encircling said bracket plate and the seed distribution tube, for removably mounting said tube alignment bracket on the seed distribution tube.

11. A tube alignment bracket for mounting on nibs of seed distribution tube of a seed planter and locating liquid-dispensing insecticide/fungicide tubes carried by the seed planter in selected fixed proximity with respect to the seed distribution tube, said tube alignment bracket comprising a bracket plate defining an attachment segment carried by the seed distribution tube, a pair of longitudinal plate slots and slot spacers provided in said attachment segment in spaced relationship with respect to each other for receiving the nibs; at least two tie straps encircling said attachment segment and the seed distribution tube for removably mounting said tube alignment bracket on the seed distribution tube, an elongated, tapered substantially I-beam shaped leg plate extending from said attachment segment; at least two plate openings provided in said leg plate for receiving and mounting the insecticide/fungicide tubes; and a pair of braces connecting said attachment segment to said leg plate, whereby the discharge ends of the insecticide/fungicide tubes are located in said selected fixed proximity with respect to the discharge end of the seed distribution tube.

12. The tube alignment bracket of claim 11 wherein said bracket plate, said leg plate and said braces are injection-molded of a plastic material.

13. The tube alignment bracket of claim 12 wherein said at least two tie straps comprises three tie straps encircling said attachment segment and the seed distribution tube in spaced relationship with respect to each other.

14. A tube alignment bracket integrally formed in a seed distribution tube of a seed planter for locating liquid-dispensing insecticide/fungicide tubes carried by the seed planter into a selected, fixed proximity to the seed distribution tube, said tube alignment bracket comprising an elongated, tapered, substantially I-beam-shaped, elongated leg plate projecting from the seed distribution tube; a plurality of tube mount openings extending through said leg plate for receiving and mounting the insecticide/fungicide tubes; a plurality of tube fittings carried by said tube mount openings in angular relationship with respect to said leg plate; and a pair of braces connecting the seed distribution tube and said leg plate, whereby the discharge ends of the insecticide/fungicide tubes are inserted in said mount openings and located in close proximity to the discharge end of the seed distribution tube.

15. The dual tube alignment bracket of claim 14 wherein said tube mount openings define a slot for receiving the insecticide/fungicide tubes and positioning insecticide/fungicide in close proximity to seeds dispensed to the ground through the seed distribution tube.

\* \* \* \* \*